United States Patent
Niinobe et al.

(10) Patent No.: US 8,097,546 B2
(45) Date of Patent: Jan. 17, 2012

(54) COMPOSITION FOR CERAMIC EXTRUSION-MOLDED BODY AND METHOD FOR MANUFACTURING A CERAMIC EXTRUSION-MOLDED BODY

(75) Inventors: Shingo Niinobe, Joetsu (JP); Kazuhisa Hayakawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/511,347

(22) Filed: Jul. 29, 2009

(65) Prior Publication Data

US 2010/0025897 A1 Feb. 4, 2010

(30) Foreign Application Priority Data

Aug. 1, 2008 (JP) ................. 2008-199155

(51) Int. Cl.
 *C04B 35/52* (2006.01)
 *C04B 35/56* (2006.01)
 *B28B 3/20* (2006.01)
(52) U.S. Cl. ............ 501/88; 264/638; 264/639; 501/89; 501/90; 501/91; 501/92; 501/134; 501/135; 501/136; 501/137; 501/138; 501/139
(58) Field of Classification Search .................. 264/638, 264/639; 501/88–92, 134–139
See application file for complete search history.

(56) References Cited

U.S. PATENT DOCUMENTS

| | | | |
|---|---|---|---|
| 4,233,256 A | 11/1980 | Ohnsorg | |
| 6,117,377 A | 9/2000 | Makino et al. | |
| 6,132,861 A * | 10/2000 | Kang et al. | 428/323 |
| 6,746,835 B2 * | 6/2004 | Watanabe et al. | 430/619 |
| 2003/0189269 A1 | 10/2003 | Makino et al. | |
| 2005/0272602 A1 | 12/2005 | Ninomiya | |
| 2007/0293387 A1 * | 12/2007 | Hayakawa et al. | 501/12 |
| 2008/0082168 A1 * | 4/2008 | Peterman et al. | 623/17.11 |
| 2008/0249637 A1 * | 10/2008 | Asgari | 623/23.72 |
| 2009/0149948 A1 * | 6/2009 | Atanasoska et al. | 623/1.42 |
| 2010/0025897 A1 * | 2/2010 | Niinobe et al. | 264/638 |

FOREIGN PATENT DOCUMENTS

| | | |
|---|---|---|
| EP | 1870389 A2 | 12/2007 |
| JP | 61-247649 A | 11/1986 |
| JP | 11-058335 A | 3/1999 |
| JP | 2002-293645 A | 10/2002 |
| JP | 2002-321981 A | 11/2002 |
| JP | 2007-331978 A | 12/2007 |
| WO | 2008/066800 A2 | 6/2008 |

OTHER PUBLICATIONS

Methocel Degree of Substitution (http://dowhpc.custhelp.com/app/answers/detail/a_id/1180/~/methocel-degree-of-substitution).*
Methocel Degree of Substitution (http://dowhpc.custhelp.com/app/answers/detail/a_id/1180/~/methocel-degree-of-substitution) printed Mar. 22, 2011.*
European Search Report dated Feb. 15, 2010, issued in corresponding European Patent Application No. 09167006.7.
Japanese Office Action dated Aug. 3, 2011, issued in corresponding Japanese Patent Application No. 2008-199155.

* cited by examiner

*Primary Examiner* — Matthew Daniels
*Assistant Examiner* — Russell Kemmerle, III
(74) *Attorney, Agent, or Firm* — Westerman, Hattori, Daniels & Adrian, LLP

(57) ABSTRACT

A composition for ceramic extrusion-molded bodies includes a ceramic material, a water-soluble cellulose ether, a styrene-sulfonate and water. A method for manufacturing a ceramic extrusion-molded body using the composition is also provided.

9 Claims, No Drawings

COMPOSITION FOR CERAMIC EXTRUSION-MOLDED BODY AND METHOD FOR MANUFACTURING A CERAMIC EXTRUSION-MOLDED BODY

CROSS-REFERENCE TO RELATED APPLICATION

This non-provisional application claims priority under 35 U.S.C. §119(a) on Patent Application No. 2008-199155 filed in Japan on Aug. 1, 2008, the entire contents of which are hereby incorporated by reference.

TECHNICAL FIELD

This invention relates to a composition for ceramic extrusion-molded bodies and also to a method for manufacturing ceramic extrusion-molded bodies.

BACKGROUND ART

Extrusion molding of ceramics has been performed by passing a ceramic green body or composition, which is obtained by mixing and kneading molding aids such as organic binders, surfactants, lubricants, and plasticizers with ceramic materials, through dies having a desired shape into a sheet, a bar, a hollow tube, a rectangular column, a hollow rectangular column, or a honeycomb structure. In particular, the extrusion-molded body in the form of ceramic honeycombs has been in use as a carrier for exhaust gas cleaning catalyst, a filter, and a heat exchanger in the fields of automobiles and various industries. According to the revision of the recent exhaust gas regulations, the partition walls of the honeycomb structure has been thinner so as to improve the cleaning performance, reduce a pressure loss and improve heat exchange efficiency.

In related art, compositions for ceramic extrusion-molded bodies have entirely made use of cellulose ethers as an organic binder because of their excellent plasticity, water retention and thermal gelation characteristics.

However, these cellulose esters are disadvantageous in that they increase in frictional force with the die portion during extrusion molding and thus, the extrusion temperature rises owing to this frictional resistance. Eventually, the cellulose ether in the extrusion molding composition is thermoreversibly gelled, so that fluidity of a plasticizer becomes deteriorated to increase a molding pressure. The resulting ceramic extrusion-molded body cannot be quickly forced out from the extrusion molding dies. In general, with the extrusion molding of a composition to which an organic binder exhibiting no thermal gelation is added, the viscosity relying on the organic binder lowers when the discharge temperature is increased, and thus the molding speed can be made faster. In molding the ceramic extrusion-molded body using a thermoreversibly gelling cellulose ester as an organic binder, there has been a problem in that it is difficult to increase the molding speed.

In order to improve extrusion moldability for overcoming these disadvantages, investigations have been made using a variety of organic additives as proposed in JP-A 11-58335 and JP-A 2002-293645 and satisfactory results have not been obtained yet.

SUMMARY OF THE INVENTION

It is accordingly an object of the invention to provide a composition for ceramic extrusion-molded bodies, which ensures a high molding speed and is capable of yielding a ceramic extrusion-molded body that is free of drying cracks.

It is another object of the invention to provide a method for manufacturing such a ceramic extrusion-molded body.

We have made intensive studies so as to attain the above objects and, as a result, found that when using a ceramic composition for extrusion molding which includes a ceramic material, a water-soluble cellulose ether, and a styrenesulfonate, extrusion molding at high temperatures becomes possible and thus, the extrusion molding speed can be made fast.

According to the invention, there is provided a composition for ceramic extrusion-molded bodies, including a ceramic material, a water-soluble cellulose ether, a styrenesulfonate and water.

The ceramic material of the composition is preferably one selected from cordierite ceramic, silicon carbide, barium titanate, lead titanate zirconate and aluminium titanate.

The water-soluble cellulose ether is preferably one selected from an alkyl cellulose, a hydroxyalkyl cellulose and a hydroxyalkyl alkyl cellulose.

The composition should preferably includes 100 parts by weight of the ceramic material, 1 to 15 parts by weight of the water-soluble cellulose ether, 1 to 15 parts by weight of the styrenesulfonate, and 10 to 50 parts by weight of water.

Moreover, there is also provided a method for manufacturing a ceramic extrusion-molded body including kneading such a composition as set out above, and subjecting the composition to extrusion molding, drying and sintering.

Advantageous Effects of Invention

With the composition of the invention, an upper limit of the molding temperature used in the course of extrusion molding can be made high, thus enabling productivity per unit time to be improved.

DESCRIPTION OF EMBODIMENTS

The ceramic materials used in the composition of the invention include alumina ceramic, cordierite ceramic, silicon carbide, silicon nitride, metallic silicon, barium titanate, lead titanate zirconate, aluminium titanate and the like. Of these, cordierite ceramic, silicon carbide, barium titanate, lead titanate zirconate and aluminium titanate are preferred.

The water-soluble cellulose ethers are preferably thermoreversibly gelling, water-soluble cellulose ethers such as alkyl cellulose, hydroxyalkyl cellulose and hydroxyalkyl alkyl cellulose. Specific examples include methyl cellulose, hydroxyethyl cellulose, hydroxypropyl methyl cellulose, hydroxyethyl methyl cellulose, hydroxyethyl ethyl cellulose and the like.

The viscosity of the water-soluble cellulose ether preferably ranges from 100 to 300,000 mPa·s, more preferably from 40,000 to 100,000 mPa·s, when determined by use of a 2 wt % aqueous solution at 20° C.

With the case of methyl cellulose, a preferred degree of substitution corresponds to 25 to 35 wt % of the methoxyl group.

With hydroxyethyl cellulose, the preferred degree of substitution corresponds to 25 to 65 wt % of the hydroxyethoxyl group.

With hydroxypropyl methyl cellulose, the degrees of substitution correspond to 20 to 35 wt % of the methoxyl group and 1 to 20 wt % of hydroxypropoxyl group, respectively.

With hydroxyethyl methyl cellulose, the degrees correspond to 20 to 35 wt % of the methoxyl group and 1 to 20 wt % of the hydroxyethoxyl group, respectively.

With hydroxyethyl ethyl cellulose, the degrees correspond to 10 to 50 wt % of the ethoxyl group and 1 to 50 wt % of the hydroxyethoxyl group, respectively.

Further, the addition amount of the water-soluble cellulose ether preferably ranges from 1 to 15 parts by weight, more preferably from 3 to 7 parts by weight, per 100 parts by weight of the ceramic material. Within this range, no crack develops in a molded body dried after ceramic molding, an amount of a binder burnt out in a subsequent course of sintering does not become large, and no crack develops upon shrinkage during sintering.

Next, styrenesuflonates include potassium para-styrenesulfonate, sodium para-styrenesulfonate, potassium ortho-styrenesulfonate, sodium ortho-styrenesulfonate, potassium meta-styrenesulfonate and sodium meta-styrenesulfonate. Of these, potassium para-styrenesulfonate is preferred because the thermal gelation temperature of a water-soluble cellulose ether aqueous solution can be elevated. It will be noted that although the method of preparing potassium para-styrenesulfonate is not limited, the usual practice is to prepare the compound through the dehydrobromination reaction of bromoethylbenzenesulfonic acid.

The addition amount of the styrenesulfonate preferably ranges from 1 to 15 parts by weight, more preferably from 1 to 5 parts by weight, per 100 parts by weight of the ceramic material.

The addition amount of water preferably ranges from 10 to 50 parts by weight, more preferably from 15 to 35 parts by weight, per 100 parts by weight of the ceramic material.

The ceramic composition of the invention may be further admixed, aside from the above ingredients, plasticizers and organic pore-making agents. The plasticizers include glycerine or derivatives thereof, sorbitan fatty acid esters, and copolymers of polypropylene and polyethylene or polybutadiene and derivatives thereof. The organic pore-making agent which is added so as to render the ceramic itself light in weight or porous may be used. The addition amount of the pore-making agent is preferably from 0.1 to 20 parts by weight, more preferably from 1 to 10 parts by weight, per 100 parts by weight of the ceramic material, within which the pore-making effect is favorably shown to a necessary extent.

In addition, there may be further added synthetic water-soluble polymers such as polyvinyl alcohol, polyethylene glycol, polyacrylamide and the like, natural water-soluble polymers such as guar gum and the like, and microorganism-fermented polysaccharides such as welan gum and the like, which have been employed in combination with water-soluble cellulose ethers in related art.

According to the method of manufacturing a ceramic extrusion-molded body of the invention, a ceramic material and a water-soluble cellulose ether are initially subjected to dry mixing, to which water and other ingredients are added, under which wet mixing is performed. The ceramic composition prepared in this way is kneaded by a kneader to provide a blend (green body or composition) for ceramic extrusion-molded body or product. In this case, the temperature of the blend is preferably at 0 to 30° C., more preferably 15 to 25° C. Thereafter, the blend is extruded into a desired shape by means of a vacuum extruder to obtain a molded body. The temperature of the molded body is preferably at 0 to 95° C., more preferably 20 to 80° C. The resulting molded bodies are subjected to uniform drying (drying by induction heating with a microwave or the like) and non-uniform drying (through circulation drying) to confirm if cracks develop.

With the uniform drying, the extrusion-molded body is cut into a length of about 20 to 30 mm and a procedure where whenever the resulting pieces are treated with a microwave at 100 W for a minute, operations of turning the pieces upside down is repeated six times, from which the presence or absence of cracks being developed can be confirmed. On the other hand, with the non-uniform drying, the extrusion-molded body is cut into a length of about 20 to 30 mm and the resulting pieces are dried for an hour by means of hot air from one direction inside a dryer (e.g. 80° C.), followed by confirmation of the presence or absence of cracks.

EXAMPLES

Examples are shown to particularly illustrate the invention, which should not be construed as limited thereto.

Examples 1 to 20

Materials other than water, indicated in Tables 1 and 2, were mixed for three minutes by means of a Henschel mixer, to which given amounts of water were added, followed by passing through a 4×¾ inches, small-sized three-roll mil (made by Inoue Manufacturing Co., Ltd.) five times in such a way that the temperature of the mixture was kept at 15 to 25° C. by water cooling. Using a small-sized vacuum extrusion molding machine having a screw diameter of 20 mm, extrusion molding of a honeycomb having an outer diameter of 20.5 mm, a pitch of 2.5 mm and a wall thickness of 0.5 mm was performed under an extrusion pressure of 5 to 10 MPa, preferably 7 MPa, followed by measurement of the temperature of the molded body at the respective extrusion-molding pressures.

The molded body was cut into a length of 50 mm, followed by repeating six times operations wherein whenever the resulting pieces were treated with a microwave at 100 W for a minute, they were turned upside down. Thereafter, the extrusion-molded body was dried for an hour by means of hot air (e.g. 80° C.) to confirm the presence or absence of cracks being developed.

The results of observation of cracks after the drying are shown in Table 1. The dried body was placed in a sintering furnace and held at 500° C. for three hours to remove the binder therefrom. The body was sintered by keeping at 1650° C. for three hours for alumina, keeping in an inert atmosphere such as of argon or the like at 2100° C. for three hours for silicon carbide, and placing dried bodies in a magnesia sheath and keeping at 1400° C. for three hours for other types of materials. The state of cracks in the sintered bodies was evaluated as "yes" or "no" and is shown in Tables 1 and 2.

(1) Ceramic Materials

| | |
|---|---|
| Alumina ceramic: | AL-160, made by Showa Lightmetal Industries Co., Ltd. |
| Cordierite ceramic: | AF-2, made by Marusu Glaze Co., Ltd. |
| Silicon carbide: | GP-1000, made by Sinano Electric Refining Co., Ltd. |
| Barium titanate: | YT-51, made by KCM Corporation Co., Ltd. |
| Lead titanate zirconate: | PE-60A, made by Fuji Titanium Industry Co., Ltd. |
| Aluminium titanate: | Recoxit A, made by Ohcera Co., Ltd. |

(2) Water-Soluble Cellulose Ether
 [1] Hydroxypropyl methyl cellulose
  (methoxyl group=29 wt %, hydroxypropoxyl group=9 wt %, viscosity of a 2 wt % aqueous solution at 20° C.: 4000 mPa·s, measured with a BL viscometer No. 3 rotor at 12 rpm)
 [2] Hydroxypropyl methyl cellulose
  (methoxyl group=28 wt %, hydroxypropoxyl group=6 wt %, viscosity of a 2 wt % aqueous solution at 20° C.: 4000 mPa·s, measured with a BL viscometer No. 3 rotor at 12 rpm)
 [3] Hydroxypropyl methyl cellulose
  (methoxyl group=29 wt %, hydroxypropoxyl group=9 wt %, viscosity of a 2 wt % aqueous solution at 20° C.: 10,000 mPa·s, measured with a BL viscometer No. 4 rotor at 30 rpm)
 [4] Hydroxypropyl methyl cellulose
  (methoxyl group=28 wt %, hydroxypropoxyl group=6 wt %, viscosity of a 2 wt % aqueous solution at 20° C.: 15,000 mPa·s, measured with a BL viscometer No. 4 rotor at 30 rpm)
 [5] Hydroxypropyl methyl cellulose
  (methoxyl group=29 wt %, hydroxypropoxyl group=9 wt %, viscosity of a 2 wt % aqueous solution at 20° C.: 30,000 mPa·s, measured with a BL viscometer No. 4 rotor at 12 rpm)
 [6] Hydroxypropyl methyl cellulose
  (methoxyl group=28 wt %, hydroxypropoxyl group=6 wt %, viscosity of a 2 wt % aqueous solution at 20° C.: 75,000 mPa·s, measured with a BL viscometer No. 4 rotor at 6 rpm)
 [7] Hydroxypropyl methyl cellulose
  (methoxyl group=23 wt %, hydroxypropoxyl group=7 wt %, viscosity of a 1 wt % aqueous solution at 20° C.: 100,000 mPa·s, measured with a BL viscometer No. 4 rotor at 3 rpm)
 [8] Methyl cellulose
  (methoxyl group=30 wt %, viscosity of a 2 wt % aqueous solution at 20° C.: 8,000 mPa·s, measured with a BL viscometer No. 4 rotor at 30 rpm)
 [9] Hydroxyethyl cellulose
  (hydroxyethyl group=54 wt %, viscosity of a 2 wt % aqueous solution at 20° C.: 10,000 mPa·s, measured with a BL viscometer No. 4 rotor at 30 rpm)
(3) Styrenesulfonate
 Potassium para-styrenesulfonate:
 first-grade reagent of Wako Pure Chemicals Co., Ltd.
 Sodium para-styrenesulfonate:
 first-grade reagent of Wako Pure Chemicals Co., Ltd.

TABLE 1

| Material (parts by weight) | Example | | | | | | | | | |
|---|---|---|---|---|---|---|---|---|---|---|
| | 1 | 2 | 3 | 4 | 5 | 6 | 7 | 8 | 9 | 10 |
| Alumina ceramic | | | | | | | | 100 | | |
| Cordierite ceramic | | 100 | 100 | 100 | 100 | 100 | | | | |
| Silicon carbide | | | | | | | 100 | | | |
| Barium titanate | | | | | | | | | 100 | |
| Lead titanate zirconate | | | | | | | | | | 100 |
| Aluminium titanate | 100 | | | | | | | | | |
| Water-soluble cellulose ether | 5 | 5 | 5 | 5 | 5 | 5 | 5 | 15 | 6 | 5 |
| MeO group | 29.0 | 28.0 | 29.0 | 28.0 | 29.0 | 28.0 | 23.0 | 29.0 | 30.5 | 0.0 |
| HPO group | 9.0 | 6.0 | 9.0 | 6.0 | 9.0 | 6.0 | 7.0 | 9.0 | 0.0 | 0.0 |
| HEO group | 0.0 | 0.0 | 0.0 | 0.0 | 0.0 | 0.0 | 0.0 | 0.0 | 0.0 | 54.0 |
| Viscosity (20° C., 2 wt %) | 4000 | 4000 | 10000 | 15000 | 30000 | 75000 | 100000 | 4000 | 8000 | 10000 |
| Potassium para-styrene-sulfonate | 2 | 3 | 4 | 5 | 6 | 10 | 12 | 15 | 8 | 2 |
| Water | 30 | 30 | 31 | 31 | 31 | 33 | 33 | 19 | 15 | 14 |
| Molding pressure (MPa) | 7 | 7 | 7 | 7 | 7 | 7 | 7 | 7 | 7 | 7 |
| Temperature of extrusion-molded body (° C.) | 60 | 60 | 60 | 60 | 60 | 60 | 80 | 60 | 55 | 60 |
| Cracks after drying | No | No | No | No | No | No | No | No | No | No |
| Cracks after sintering | No | No | No | No | No | No | No | No | No | No |

(MeO: methoxyl, HPO: hydroxypropoxyl, HEO: hydroxyethoxyl)

TABLE 2

| Material (parts by weight) | Example | | | | | | | | | |
|---|---|---|---|---|---|---|---|---|---|---|
| | 11 | 12 | 13 | 14 | 15 | 16 | 17 | 18 | 19 | 20 |
| Alumina ceramic | | | | | | | | 100 | | |
| Cordierite ceramic | | 100 | 100 | 100 | 100 | 100 | | | | |
| Silicon carbide | | | | | | | 100 | | | |
| Barium titanate | | | | | | | | | 100 | |
| Lead titanate zirconate | | | | | | | | | | 100 |
| Aluminium titanate | 100 | | | | | | | | | |
| Water-soluble cellulose ether | 5 | 5 | 5 | 5 | 5 | 5 | 5 | 15 | 6 | 5 |
| MeO group | 29.0 | 28.0 | 29.0 | 28.0 | 29.0 | 28.0 | 23.0 | 29.0 | 30.5 | 0.0 |

TABLE 2-continued

| Material | Example | | | | | | | | | |
|---|---|---|---|---|---|---|---|---|---|---|
| (parts by weight) | 11 | 12 | 13 | 14 | 15 | 16 | 17 | 18 | 19 | 20 |
| HPO group | 9.0 | 6.0 | 9.0 | 6.0 | 9.0 | 6.0 | 7.0 | 9.0 | 0.0 | 0.0 |
| HEO group | 0.0 | 0.0 | 0.0 | 0.0 | 0.0 | 0.0 | 0.0 | 0.0 | 0.0 | 54.0 |
| Viscosity (20° C., 2 wt %) | 4000 | 4000 | 10000 | 15000 | 30000 | 75000 | 100000 | 4000 | 8000 | 10000 |
| Sodium para-styrene-sulfonate | 2 | 3 | 4 | 5 | 6 | 10 | 12 | 15 | 8 | 2 |
| Water | 30 | 30 | 31 | 31 | 31 | 33 | 33 | 19 | 15 | 14 |
| Molding pressure (MPa) | 7 | 7 | 7 | 7 | 7 | 7 | 7 | 7 | 7 | 7 |
| Temperature of extrusion-molded body (° C.) | 60 | 60 | 60 | 60 | 60 | 60 | 80 | 60 | 55 | 60 |
| Cracks after drying | No | No | No | No | No | No | No | No | No | No |
| Cracks after sintering | No | No | No | No | No | No | No | No | No | No |

(MeO: methoxyl, HPO: hydroxypropoxyl, HEO: hydroxyethoxyl)

Japanese Patent Application No. 2008-199155 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A composition for ceramic extrusion-molded bodies, comprising a ceramic material, a water-soluble cellulose ether, a styrenesulfonate selected from the group consisting of potassium para-styrenesulfonate, sodium para-styrenesulfonate, potassium ortho-styrenesulfonate, sodium ortho-styrenesulfonate, potassium meta-styrenesulfonate and sodium meta-styrenesulfonate, and water.

2. The composition according to claim 1, wherein said ceramic material is selected from the group consisting of cordierite ceramic, silicon carbide, barium titanate, lead titanate zirconate and aluminium titanate.

3. The composition according to claim 1, wherein said water-soluble cellulose ether is selected from the group consisting of an alkyl cellulose, a hydroxyalkyl cellulose and a hydroxyalkyl alkyl cellulose.

4. The composition according to claim 3, wherein said water-soluble cellulose ether is selected from the group consisting of methyl cellulose having a degree of substitution corresponding to 25 to 35 wt % of the methoxyl group,
hydroxyethyl cellulose having a degree of substitution corresponding to 25 to 65 wt % of the hydroxyethoxyl group,
hydroxypropyl methyl cellulose having degrees of substitution corresponding to 20 to 35 wt % of the methoxyl group and 1 to 20 wt % of hydroxypropoxyl group, respectively,
hydroxyethyl methyl cellulose having degrees corresponding to 20 to 35 wt % of the methoxyl group and 1 to 20 wt % of the hydroxyethoxyl group, respectively, and
hydroxyethyl ethyl cellulose having degrees corresponding to 10 to 50 wt % of the ethoxyl group and 1 to 50 wt % of the hydroxyethoxyl group, respectively.

5. The composition according to claim 1, wherein said composition comprises 100 parts by weight of the ceramic material, 1 to 15 parts by weight of the water-soluble cellulose ether, 1 to 15 parts by weight of the styrenesulfonate, and 10 to 50 parts by weight of water.

6. A method for manufacturing a ceramic extrusion-molded body, comprising the steps of: kneading the composition defined in claim 1; and subjecting the resulting mixture to extrusion molding, drying and sintering.

7. A composition for ceramic extrusion-molded bodies, comprising 100 parts by weight of a ceramic material, 1 to 15 parts by weight of a water-soluble cellulose ether, 1 to 15 parts by weight of a styrenesulfonate, and 10 to 50 parts by weight of water,
said ceramic material being selected from the group consisting of cordierite ceramic, silicon carbide, barium titanate, lead titanate zirconate and aluminium titanate,
said water-soluble cellulose ether being selected from the group consisting of an alkyl cellulose, a hydroxyalkyl cellulose and a hydroxyalkyl alkyl cellulose, and
said styrenesulfonate being selected from the group consisting of potassium para-styrenesulfonate, sodium para-styrenesulfonate, potassium ortho-styrenesulfonate, sodium ortho-styrenesulfonate, potassium meta-styrenesulfonate, and sodium meta-styrenesulfonate.

8. The composition according to claim 7, wherein said water-soluble cellulose ether is selected from the group consisting of methyl cellulose having a degree of substitution corresponding to 25 to 35 wt % of the methoxyl group,
hydroxyethyl cellulose having a degree of substitution corresponding to 25 to 65 wt % of the hydroxyethoxyl group,
hydroxypropyl methyl cellulose having degrees of substitution corresponding to 20 to 35 wt % of the methoxyl group and 1 to 20 wt % of hydroxypropoxyl group, respectively,
hydroxyethyl methyl cellulose having degrees corresponding to 20 to 35 wt % of the methoxyl group and 1 to 20 wt % of the hydroxyethoxyl group, respectively, and
hydroxyethyl ethyl cellulose having degrees corresponding to 10 to 50 wt % of the ethoxyl group and 1 to 50 wt % of the hydroxyethoxyl group, respectively.

9. A method for manufacturing a ceramic extrusion-molded body, comprising the steps of: kneading the composition defined in claim 7; and subjecting the resulting mixture to extrusion molding, drying and sintering.

* * * * *